United States Patent
Lee et al.

(10) Patent No.: US 10,064,258 B2
(45) Date of Patent: Aug. 28, 2018

(54) METHOD FOR PROVIDING DIRECT CURRENT TO WIRELESS DIMMER, AND APPARATUS AND SYSTEM THEREFOR

(71) Applicant: LG INNOTEK CO., LTD., Seoul (KR)

(72) Inventors: Jong Hyun Lee, Seoul (KR); Jung Tae Kim, Seoul (KR); Dong Yeol Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/236,741

(22) Filed: Aug. 15, 2016

(65) Prior Publication Data

US 2017/0079122 A1 Mar. 16, 2017

(30) Foreign Application Priority Data

Sep. 14, 2015 (KR) .................. 10-2015-0129821

(51) Int. Cl.
*H05B 37/02* (2006.01)
*H02J 7/00* (2006.01)
(Continued)

(52) U.S. Cl.
CPC ........ *H05B 37/0272* (2013.01); *H02J 7/0052* (2013.01); *H05B 41/39* (2013.01); *H02J 7/35* (2013.01)

(58) Field of Classification Search
CPC ........... H02J 7/0052; H02M 3/04; H02M 7/04
See application file for complete search history.

(56) References Cited

U.S. PATENT DOCUMENTS 5,414,475 A * 5/1995 Trzyna .................... H04N 5/63
 307/64
6,496,390 B2 * 12/2002 Yang ................. H02M 3/33507
 363/21.07

(Continued)

FOREIGN PATENT DOCUMENTS

CN 201758471 U 3/2011
CN 202005028 U 10/2011

OTHER PUBLICATIONS

SIPO Office Action for Chinese Application No. 201610821867.2 dated Jan. 31, 2018, which corresponds to the above-referenced U.S. application.

*Primary Examiner* — Alexander H Taningco
*Assistant Examiner* — Kurtis R Bahr
(74) *Attorney, Agent, or Firm* — LRK Patent Law Firm

(57) ABSTRACT

A wireless dimming apparatus operatively associated with a driving power apparatus operating with AC power includes a controller, a non-insulting type DC-DC converter for receiving DC power AC-DC converted by the driving power apparatus and converting the DC power into a predetermined operation voltage of the wireless dimming apparatus, a wireless communicator for demodulating an RF signal received through an installed antenna and transmitting the RF signal to the controller, a dimming circuit for receiving a predetermined lighting control signal corresponding to the demodulated RF signal from the controller and transmitting the predetermined lighting control signal to the driving power apparatus, and a DC power switch for supplying the operation voltage to the dimming circuit according to a predetermined control signal of the controller. Accordingly, the wireless dimming apparatus has a small size and high cost efficiency.

8 Claims, 9 Drawing Sheets

(51) Int. Cl.
*H05B 41/39* (2006.01)
*H02J 7/35* (2006.01)

(56) References Cited

U.S. PATENT DOCUMENTS

| | | | | |
|---|---|---|---|---|
| 8,742,694 B2* | 6/2014 | Bora | ................ | H05B 33/0863 |
| | | | | 315/113 |
| 8,928,236 B1* | 1/2015 | Mays, II | ............ | H05B 33/0854 |
| | | | | 315/200 R |
| 9,055,646 B2* | 6/2015 | Liao | ................ | H05B 33/0815 |
| 9,084,333 B2* | 7/2015 | Chandran | .......... | H05B 37/0263 |
| 9,445,481 B2* | 9/2016 | Kim | ................ | H05B 37/0272 |
| 2007/0124615 A1* | 5/2007 | Orr | ........................ | G06F 1/189 |
| | | | | 713/300 |
| 2011/0083028 A1* | 4/2011 | Jung | ...................... | H02J 9/005 |
| | | | | 713/323 |
| 2012/0080944 A1* | 4/2012 | Recker | .................... | H02J 9/02 |
| | | | | 307/25 |
| 2012/0146986 A1 | 6/2012 | Ouchi et al. | | |
| 2014/0062332 A1 | 3/2014 | Kim | | |

* cited by examiner

METHOD FOR PROVIDING DIRECT CURRENT TO WIRELESS DIMMER, AND APPARATUS AND SYSTEM THEREFOR

CROSS REFERENCE TO RELATED APPLICATION

This application claims priority under 35 U.S.C. § 119 to Korean Patent Application No 10-2015-0129821, filed in Korea on Sep. 14, 2015, which is hereby incorporated in its entirety by reference as if fully set forth herein.

BACKGROUND OF THE INVENTION

1. Field of the Invention

Embodiments relate to a wireless dimming system, and more particularly, to a method of supplying direct current (DC) power to a wireless dimmer that is capable of controlling a lighting apparatus via wireless communication and an apparatus and system therefor.

2. Description of Related Art

As interest in home automation (HA) becomes higher, a method of remotely controlling various home electronic equipments installed at home via a wired/wireless communication network has drawn attraction and, in this regard, a technology for transmitting a remote control signal through a wired/wireless communication network to a switch that is almost necessarily installed every space or room in a building to control an operation of a home electronic equipment has been gradually used according to the recent trend.

Recently, for energy saving, a smart lighting system for adaptively controlling a lighting according to a surrounding illumination and a time zone has been abundantly supplied.

Accordingly, a smart, lighting apparatus for detecting human approach and movement to automatically control a lighting lamp has been installed and used in a park or the like.

Along with development of wireless communication technologies, a technology of collectively controlling a lighting apparatus through a wireless dimmer from a remote site has been developed and, in this case, in order to receive a remote control signal, a wireless communication module and a controller installed in a wireless dimmer need to be always supplied with power and to detect a remote control signal.

FIG. 1 is a diagram illustrating a structure of a wireless dimming system according to prior art. Alternating current (AC) power is directly supplied to a wireless dimmer 140 that has been currently introduced from an AC power supply 110 and, in this end, AC power is converted into direct current (DC) power to supply power required for an operation of an internal component is supplied to the wireless dimmer 140.

However, when external AC power is supplied directly to a wireless dimmer, the wireless dimmer 140 needs to include an AC filter 150 for removing separate harmonics, an insulating type AC-DC converter 160, a surge protector 175 for shutting off an instantaneously generated high voltage, and so on as well as a dimming circuit 170, a controller 180, and a wireless communicator 190, as illustrated in FIG. 1.

The conventional wireless dimmer needs additional wiring for AC circuit configuration and, also, has an insulating type converter, a structure of which is large and complex structure and which has high manufacturing cost and, thus, there is a problem in miniaturizing the dimmer.

In particular, a conventional method of supplying power to a wireless dimmer is disadvantageous to have a high fault occurrence rate due to a noise component such as Surge and Voltage Drop input, which are input through an AC power supply and to consume high installment cost and time according to additional components of an AC circuit during installment of the AC circuit. In addition, it is disadvantageous to increase a volume of a wireless dimmer.

SUMMARY

Embodiments provide a wireless dimming apparatus that is capable of supplying direct current (DC) power and a method of supplying DC power to the wireless dimming apparatus.

Embodiments provide a wireless dimmer obtained by removing an alternating current (AC) circuit to achieve a small value and high stability by supplying DC power to the wireless dimmer and a method of supplying DC power to the wireless dimmer.

Further, embodiments provide a wireless dimming apparatus using renewable energy using sunlight and wind force.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In one embodiment a wireless dimming apparatus operatively associated with a driving power apparatus operating with alternating current (AC) power includes a controller, non-insulting type direct current (DC)-DC converter for receiving DC power AC-DC converted by the driving power apparatus and converting the DC power into a predetermined operation voltage of the wireless dimming apparatus, a wireless communicator for demodulating a radio frequency (RF) signal received through an installed antenna and transmitting the RF signal to the controller, a dimming circuit for receiving a predetermined lighting control signal corresponding to the demodulated RF signal from the controller and transmitting the predetermined lighting control signal to the driving power apparatus, and a DC power switch for supplying the operation voltage to the dimming circuit according to a predetermined control signal of the controller.

The wireless dimming apparatus may further include a charging battery for supplying power required for operations of the controller and the wireless communicator in a standby mode, wherein the DC power switch supplies the converted operation voltage to the charging battery according to a predetermined control signal of the controller.

The controller may monitors a current battery charging state of the charging battery, and when the current battery charging state is a charging complete state, the controller may control the DC power switch to shut off supply of the operation voltage to the charging battery.

When the lighting control signal is a predetermined lighting ON signal for driving a lighting apparatus connected to the driving power apparatus, the DC power may be supplied, to the non-insulating type DC-DC converter.

When the lighting apparatus is driven and a predetermined light control signal for stopping drive of the lighting apparatus is transmitted to the driving power apparatus by the dimming circuit, supply of the DC power to the non-insulating type DC-DC converter may be stopped, and when supply of the DC power is stopped, the charging battery may be charged by receiving DC power from an external DC power source.

The DC power generated using at least one of sunlight and wind force may be supplied to the charging battery from the external DC power source.

Intensity of DC power AC-DC converted by the driving power apparatus may be changed according to the lighting control signal.

In another embodiment, a method of supplying direct current (DC) power for a wireless dimming apparatus operatively associated with a driving power apparatus operating with alternating current (AC) power includes, in a standby mode, upon demodulating a radio frequency signal received through an installed antenna and acquiring a predetermined lighting control signal, transmitting the lighting control signal to the driving power apparatus and transitioning the standby mode to an operation mode, in the operation mode, receiving DC power AC-DC converted by the driving power apparatus and converting the DC power into a predetermined operation voltage corresponding to the wireless dimming apparatus, and in the operation mode, supplying the operation voltage to a dimming circuit.

The wireless dimming apparatus may include a charging battery, and the method may further include, in the standby mode, being on standby to receive the RF signal using power charged in the charging battery.

The method may further include, in the operation mode, supplying the converted operation voltage to the charging battery.

The method may further include monitoring a current battery charging state of the charging battery, and shutting off supply of the operation voltage to the charging battery based on the current battery charging state.

The method may further include, in the standby mode, monitoring a current battery charging state of the charging battery, and when the current battery charging state is a predetermined battery LOW state, receiving DC power from an external DC power source and charging the charging battery.

In the operation mode, when the acquired lighting, control signal is a predetermined lighting OFF signal for stopping drive of the lighting apparatus, DC power is received from an external DC power source to charge the charging battery.

The DC power generated using at least one of sunlight and wind force may be supplied to the charging battery from the external DC power source.

DC power supplied to the wireless dimming apparatus from DC power AC-DC converted by the driving power apparatus may be changed according to the lighting control signal.

The lighting control signal may include at least one of a signal for changing illumination, a signal for lighting ON/OFF, a signal for changing lighting color, and a signal for changing lighting pattern.

In another embodiment, a computer readable recording medium having recorded thereon a program for executing any one of the above methods of supplying DC power may be provided.

In another embodiment, a wireless dimming system includes a lighting apparatus with illumination being variable according to intensity of received power, a driving power apparatus including an insulating type alternating current (AC)-direct circuit (DC) converter for receiving the AC power, converting the AC power into DC power, and supplying the converted DC power to the lighting apparatus, and a wireless dimming apparatus including a dimming circuit for transmitting a predetermined lighting control signal acquired by demodulating a received RF signal to the driving power apparatus and a non-insulating type DC-DC converter for receiving the DC power converted by the insulating type AC-DC converter and converting the DC power into a predetermined operation voltage.

The wireless dimming apparatus may further include a charging battery for supplying a predetermined operation voltage for demodulating the RF signal in a standby mode, when the lighting control signal is a predetermined lighting OFF signal for stopping drive of the lighting apparatus, the charging battery may be charged by receiving DC power from an external DC power source.

It is to be understood that both the foregoing general description and the following detailed description of the disclosure are exemplary and explanatory and are intended to provide further explanation of the disclosure as claimed.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Figure 1:
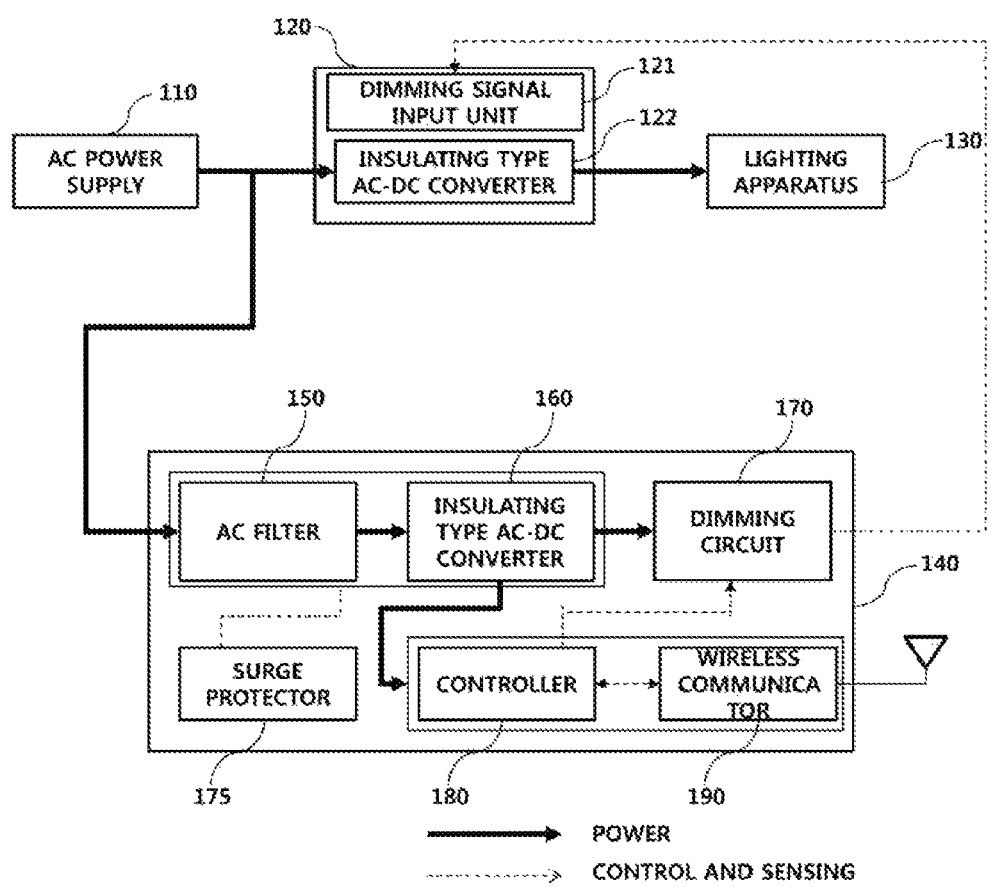
FIG. 1 is a diagram illustrating a structure of a wireless dimming system according to prior art.

Hereinafter, embodiments will be described with reference to the annexed drawings. In addition, the suffixes "module" and "unit" of elements herein are used for convenience of description and thus can be used interchangeably and do not have any distinguishable meanings or functions.

Although all elements constituting the embodiments of the disclosure are described as integrated into a single one or to be operated as a single one, the disclosure is not necessarily limited to such embodiments. According to embodiments, all of the elements may be selectively integrated into one or more and be operated as one or more within the object and the scope of the disclosure. Each of the elements may be implemented as independent hardware. Alternatively, some or all of the elements may ho selectively combined into a computer program having a program module performing some or all functions combined in one or more pieces of hardware. A plurality of codes and code segments constituting the computer program may be easily understood by those skilled in the art to which the disclosure pertains. The computer program may be stored in computer readable media such that the computer program is read and executed by a computer to implement embodiments of the disclosure.

Computer program storage media may include magnetic recording media, optical recording media, and carrier wave media.

In addition, in description of elements, it will be understood that when an element or layer is referred to as being "on" or "under" another element or layer, the element or layer can be directly on another element or layer or intervening elements or layers, and criteria for "on" and "under" will be provided based on the drawings.

The term "comprises", "includes", or "has" described herein should be interpreted not to exclude other elements but to further include such other elements since the corresponding elements may be included unless mentioned otherwise. All terms including technical or scientific terms have the same meanings as generally understood by a person having ordinary skill in the art to which the disclosure pertains unless mentioned otherwise. Generally used terms, such as terms defined in a dictionary, should be interpreted to coincide with meanings of the related art from the context. Unless differently defined in the disclosure, such terms should not, be interpreted in an ideal or excessively formal manner.

It will be understood that, although the terms first, second, A, B, (a), (b), etc. may be used herein to describe various elements of the disclosure, these terms are only used to distinguish one element from another element and essential, order, or sequence of corresponding elements are not limited by these terms. It will be understood that when one element is referred to as being "connected, to", "coupled to", or "access" another element, one element may be "connected to", "coupled to", or "access" another element via a further element although one element may be directly connected to or directly access another element.

Examples of a user device that is capable of transmitting a remote control signal via wireless communication with a wireless dimming apparatus described in this specification may include a mobile phone, a smart phone, a laptop computer, a terminal for digital broadcast, personal digital assistants (PDA), a portable multimedia player (PMP), a navigation device, various wearable devices including a smart watch, and so on.

A wireless dimming apparatus described in this specification may receive a remote control signal from a user device via a mobile communication network and near field communication.

Here, the mobile communication, network may be, but is not limited to, a communication network to which mobile communication standard such as Wideband Code Division Multiple Access (WCDMA) and Long Term Evolution (LTE)/LTE-Advanced and may also include a wireless internet communication network such as Wi-Max/Wi-Fi.

The near field communication may include, but is not limited to, Bluetooth communication, ZigBee communication, radio frequency identification (RFID) communication, UWB communication, and so on.

In addition, the wireless dimming apparatus may collect state information of a lighting apparatus and transmit the state information to a predetermined user device. Here, the status information of a lighting apparatus may include, but is not limited to, power consumption information, failure/defect state information, battery charging state, and so on.

In general, application software used in a user device or the like may be referred to as "App". Hereinafter, for convenience of description, application software and "App" or "Application" will be interchangeably used.

A user may remotely control a lighting apparatus using a predetermined wireless dimmer control App installed in a user device. Here, the user may set illumination, a lighting operation pattern, color of lighting, and a time zone for turning on a lighting apparatus as well as ON/OFF operation control of a lighting apparatus through a wireless dimmer control App but is not limited thereto.

Figure 2:
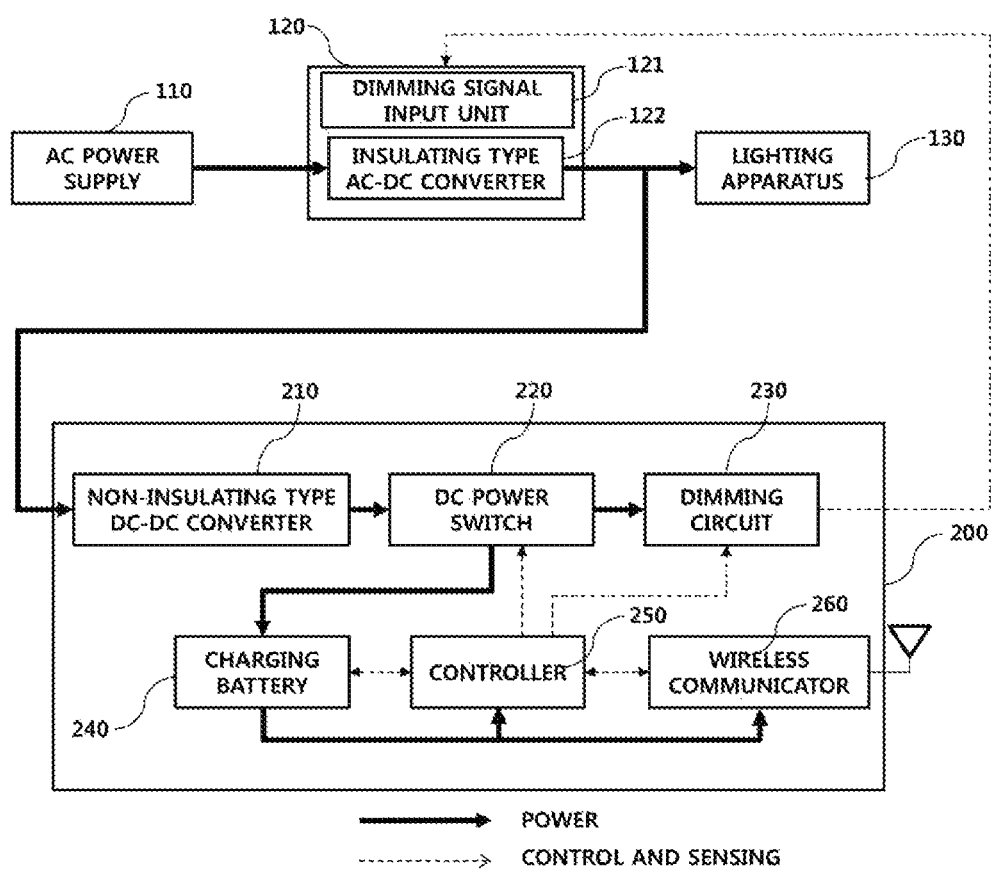
FIG. 2 is a block diagram for explanation of a structure of a wireless dimming system according to an embodiment.

FIG. 2 is a block diagram for explanation of a structure of a wireless dimming system according to an embodiment.

Referring to FIG. 2, the wireless dimming system may largely include an alternating current (AC) power supply 110, a driving power apparatus 120, a lighting apparatus 130, and a wireless dimming apparatus 200.

The AC power supply 110 may supply AC power to the driving power apparatus 120.

The driving power apparatus 120 may include a dimming signal input unit 121 for receiving a predetermined dimming signal from the wireless dimming apparatus 140 and an insulating type AC-DC converter 122 for converting the AC power supplied from the AC power supply 110 into DC power according to a predetermined dimming signal.

The DC power converted by the insulating type AC-DC converter 122 of the driving power apparatus 120 may be supplied to the lighting apparatus 130.

The lighting apparatus 130 may be configured as, but is not limited to, a light emitting diode (LED), and may be any lighting apparatus that is capable of changing dimming, color of lighting, lighting pattern, and so on.

In particular, according to an embodiment, DC power converted by the insulating type AC-DC converter 122 may be branched and supplied to a wireless dimming apparatus 200. In detail, the branched DC power may be supplied to a non-insulating type DC-DC converter 210 of the wireless dimming apparatus 200.

The non-insulating type DC-DC converter 210 may convert power into predetermined DC power required for an operation of the wireless dimming apparatus 200 and transmit the DC power to a DC power switch 220. In this case, output DC-power of the non-insulating type DC-DC converter 210 may be lower than the branched DC power. For example, the branched DC power may be 3 watts (W) and output DC power of the non-insulating type DC-DC converter 210 may be 1 watt (W) but embodiments are not limited thereto, and thus output DC power may be changed according to power required for an operation of the wireless dimming apparatus 200. In particular, the branched DC power may be changed according to a dimming signal for change in illumination. In this case, a predetermined power distributer (not shown) may be installed at one side of a rear end of the insulating type AC-DC converter 122 such that the branched DC power is greater than power required for an operation of the wireless dimming apparatus 200—i.e., operating power of the wireless dimming apparatus 200—.

The DC power switch 220 may switch or distribute output DC power of the non-insulating type DC-DC converter 210 and supply the output DC power to a dimming circuit 230 or(and) a charging battery 240 according to a control signal of a controller 250.

The dimming circuit 230 may generate a predetermined dimming signal and transmit the dimming signal to the driving power apparatus 120 according to the control signal of the controller 250.

A wireless communicator 260 may decode a radio signal received through an antenna and transmit the radio signal to the controller 250 or may demodulate data received from the controller 250 and wirelessly transmit the data through the antenna.

The wireless communicator 260 may include one or more modules that allow the wireless dimming apparatus 200 to perform wireless communication using an accessed communication network. For example, the wireless communicator 260 may include at least one of a mobile communication module, a wireless Internet module, and a near field communication.

The mobile communication module may transmit/receive a radio signal to and from a base station, a relay, a repeater, a femto cell, and so on through a wireless interface of a mobile communication network. Here, the radio signal may include various types of data signals according to transmission and reception of a voice and video call signal or a text/multimedia message.

For example, the mobile communication module may communicate with a three-generation (3G) including a Wideband Code Division Multiple Access (WCDMA) and a four-generation (4G) network including a Long Term Evolution (LTE)/LTE-Advanced network but embodiments are not limited thereto and, thus, the mobile communication module may include an access unit for access to a 5G network and a post-evolved network thereof according to evolution of mobile communication standard.

The wireless Internet module may refer to a transmission/reception module for wireless Internet access and may be installed in the wireless dimming apparatus 200 or installed outside the wireless dimming apparatus 200 through a predetermined interface port (not shown). Examples of the wireless Internet technology may include, but is not limited to, wireless LAN (WLAN), Wi-Fi, Wirelessbroadband (Wibro), and World Interoperability for Microwave Access (Wimax) and include any technology for wireless Internet access.

The near field communication module may refer to a module for near field communication. Examples of the near field communication technology may include Bluetooth, radio frequency identification (RFID), infrared data association (IrDA), UltraWideband (UWB), ZigBee, and so on.

The wireless dimming apparatus 200 according to an embodiment may provide a wired communication function as well as the above wireless communication function. For example, the wireless dimming apparatus 200 may further include a wired communication module (not shown) for performing a function such as power line communication, IP communication using an Internet communication port, and so on.

The controller 250 may monitor a current charging state of the charging battery 240 and control an operation of the DC power switch 220 based on the current charging state. For example, when a current charging level of the charging battery 240 is equal to or less than a predetermined reference value—hereinafter, referred to as a battery LOW level—, the controller 250 may transmit a predetermined control signal to a DC power switch 220 and control the non-insulating type DC-DC converter 210 to supply a partial or entire portion of output DC power to the charging battery 240 to initiate charging.

As another example, when the current charging level of the charging battery 240 is a charging complete level, the controller 250 may transmit a predetermined control signal indicating instructions to shut off supply of DC power to the charging battery 240 in order to protect the charging battery 240.

The wireless dimming apparatus 200 may monitor an RF signal that is periodically or continuously received via wireless communication using power charged in the charging battery 240 in a standby state in which the lighting apparatus 130 is not driven. To this end, power required for operations of the controller 250 and the wireless communicator 260 needs to be supplied even in a standby state.

Figure 3:
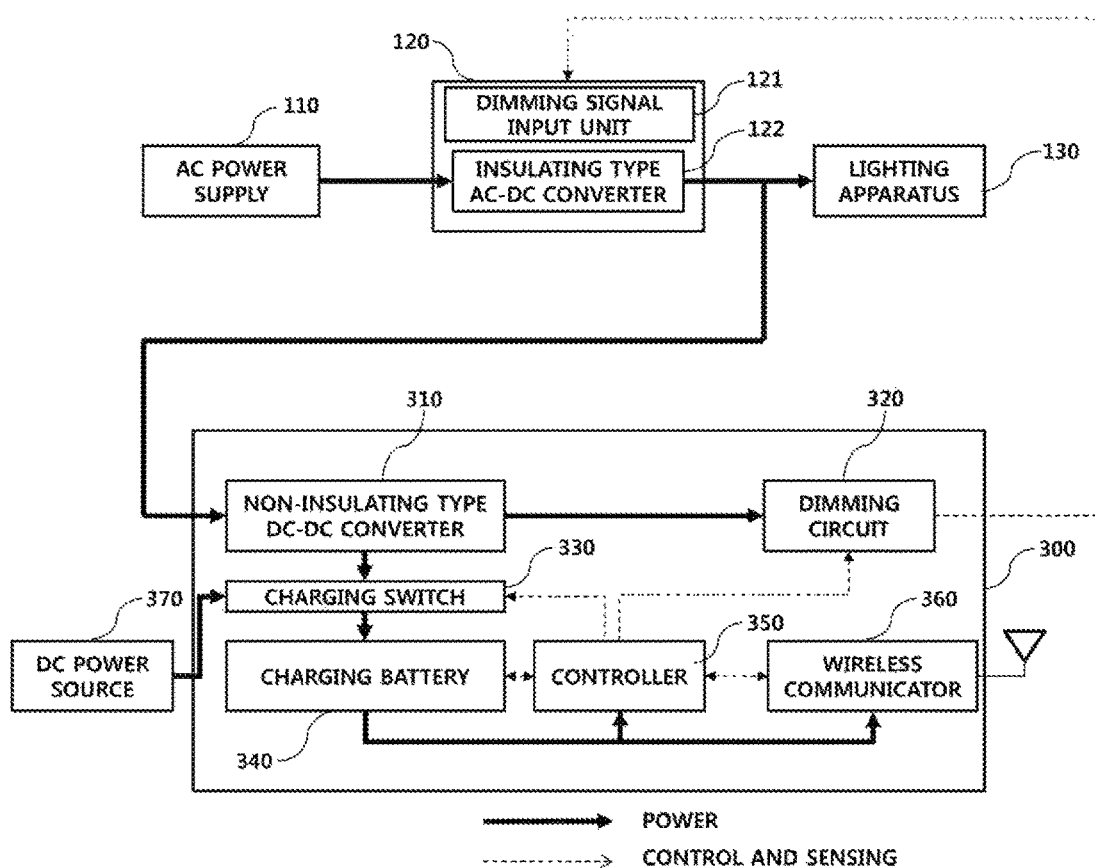
FIG. 3 is a block diagram for explanation of a structure of a wireless dimming system according to another embodiment.

FIG. 3 is a block diagram for explanation of a structure of a wireless dimming system according to another embodiment.

Referring to FIG. 3, a charging battery 340 of a wireless dimming apparatus 300 may be charged with DC power supplied from an external DC power source 370 as well as output DC power of a non-insulating type DC-DC converter 310.

Here, the external DC power source 370 may supply DC power using renewable energy such as sunlight and wind force and may be connected to a charging switch 330.

As illustrated in FIG. 3, the lion-insulating type DC-DC converter 310 may have two DC power output ports. Here, one of the DC power output ports may be connected to a dimming circuit 320 and the other one may be connected to the charging switch 330.

A controller 350 may transmit a predetermined control signal to the charging switch 330 so as to perform battery charging using the DC power supplied through the DC power source 370 when an operation of the lighting apparatus 130 is OFF.

On the other hand, the controller 350 may transmit a predetermined control signal to the charging switch 330 so as to perform battery charging using the output DC power of the non-insulating type DC-DC converter 310 when the operation of the lighting apparatus 130 is ON.

When the operation of the lighting apparatus 130 is On and the DC power supplied to the charging battery 340 by the non-insulating type DC-DC converter 310 is equal to or less than a predetermined reference value, the controller 350 may control the charging switch 330 to supply the DC power of the DC power source 370 as well as the output DC power of the non-insulating type DC-DC converter 310 to the charging battery 340.

A description of detailed operations and functions of a wireless communicator 360 and the dimming circuit 320 will be substituted with the above description of the wireless communicator 260 and the dimming circuit 230 of FIG. 2.

In particular, with regard to the wireless dimming system illustrated in FIG. 3, even if the lighting apparatus 130 is not driven for a long time and DC power is not supplied to the wireless dimming apparatus 300, a battery may be charged through the DC power source 370, thereby preventing the case in which the wireless dimming apparatus 300 becomes useless due to battery discharging.

In the wireless dimming system according to the disclosure, intensity of the DC power supplied to the non-insulating type DC-DC converter 310 from the driving power apparatus 120 may be varied according to change in illumination of the lighting apparatus 130 or the like.

Accordingly, the DC power supplied to the charging switch 330 from the non-insulating type DC-DC converter 310 may be smaller than power required for charging of the charging battery 340 and, accordingly, the charging battery 340 may not normally charged or a charging speed thereof may be relatively low.

However, when the operation of the lighting apparatus 130 is On and the DC power or DC voltage applied to the charging battery 340 is equal to or less than a predetermined reference value, the controller 350 of the wireless dimming apparatus 300 illustrated in FIG. 3 may control the charging switch 330 to additionally supply the DC power of the DC power source 370 to the charging battery 340. Accordingly, the charging efficiency and charging speed of the charging battery 340 may be optimized.

Figure 4:
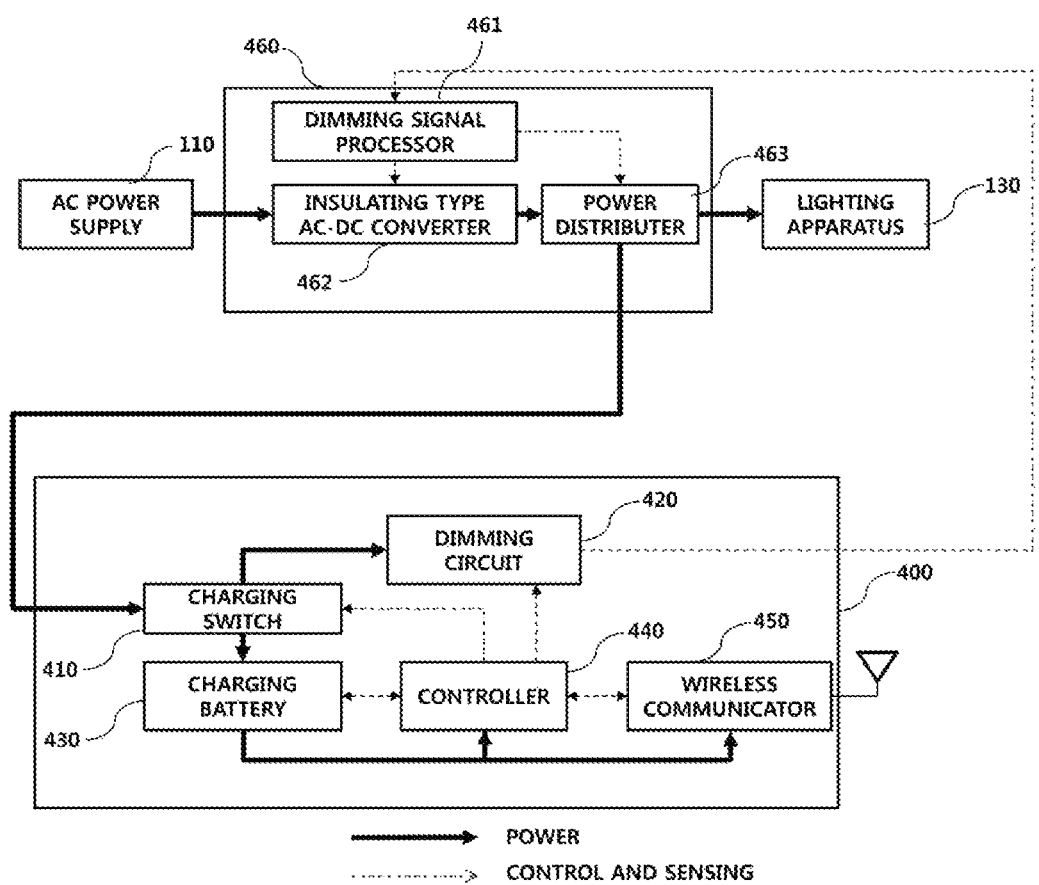
FIG. 4 is a block diagram for explanation of a structure of a wireless dimming system according to another embodiment.

FIG. 4 is a block diagram for explanation of a structure of a wireless dimming system according to another embodiment.

Referring to FIG. 4, a driving power apparatus 460 of the wireless dimming system may include a dimming signal processor 461, an insulating type AC-DC converter 462, and a power distributer 463.

The dimming signal processor 461 may control operations of the insulating type AC-DC converter 462 and the power distributer 463 according to the dimming signal received from a dimming circuit 420.

For example, upon receiving a predetermined lighting control signal including illumination information, the dimming signal processor 461 may determine output DC power intensity of the insulating type AC-DC converter 462 based on the received illumination information and control the insulating type AC-DC converter 462 to perform AC-DC conversion with the determined output DC power intensity.

The dimming signal processor 461 may determine intensity of DC power to be supplied to the lighting apparatus 130 and intensity of DC power to be supplied to a wireless dimming apparatus 400 based on the illumination information and may control the power distributer 463 according to the determination result.

For example, when the DC power to be supplied to the lighting apparatus 130 is 5 W and the DC power to be supplied to the wireless dimming apparatus 400 is 2 W according to the illumination information, the output DC power intensity of the insulating type AC-DC converter 462 may be determined to be 7 W. The power distributer 463 may distribute input power of 7 W and supply 5 W and 2 W to the lighting apparatus 130 and the wireless dimming apparatus 400, respectively, according to a predetermined control signal of the dimming signal processor 461.

As illustrated in FIG. 4, the wireless dimming apparatus 400 may include a charging switch 410, the dimming circuit 420, a charging battery 430, a controller 440, and a wireless communicator 450.

The charging switch 410 may be connected to the power distributer 463 and may receive DC power.

The charging switch 410 may distribute or switch the DC power input and provide the DC power to the dimming circuit 420 or(and) the charging battery 430 according to a control signal of the controller 440.

For example, the controller 440 may determine whether power needs to be continuously supplied to the dimming circuit 420 based on a dimming control signal received from the wireless communicator 450.

As the determination result, when it is necessary to continuously supply power, the controller 440 may control the charging switch 410 to supply predetermined DC power required for an operation of the dimming circuit 420.

On the other hand, as the determination result, when it is not necessary to continuously supply power, the controller 440 may control the charging switch 410 to shut off supply of DC power to the dimming circuit 420 and to supply DC power to the charging battery 430.

Needless to say, when DC power supplied from the power distributer 463 exceeds DC power required for the operation of the dimming circuit 420, the controller 440 may control a changing switch to supply DC power corresponding to the excess to the charging battery 430.

Figure 5:
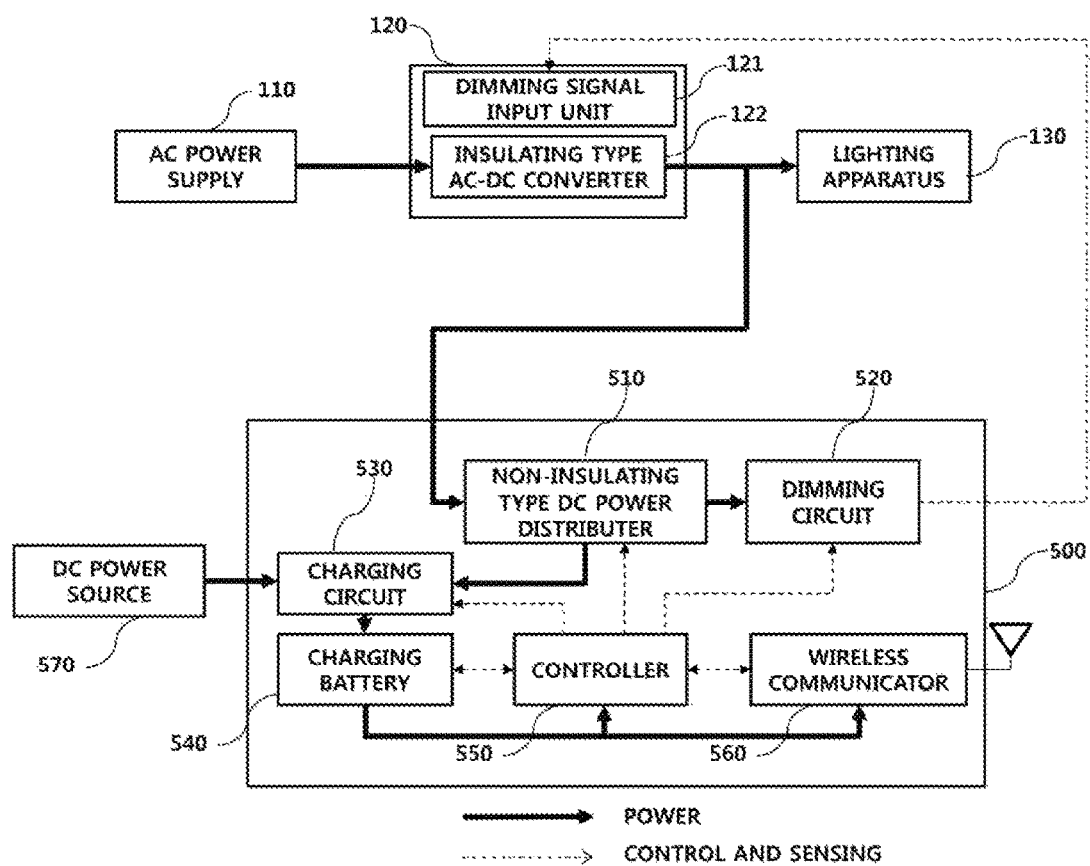
FIG. 5 is a block diagram for explanation of a wireless dimming system according to another embodiment.

FIG. 5 is a block diagram for explanation of a wireless dimming system according to another embodiment.

Referring to FIG. 5, a wireless dimming apparatus 500 a non-insulating type DC power distributer 510 may include a dimming circuit 520, a charging circuit 530, a charging battery 540, a controller 550, and a wireless communicator 500.

The non-insulating type DC power distributer 510 may supply the remaining input DC power except for DC power required for the operation of the dimming circuit 520 from the input DC power to the charging circuit 530.

The charging circuit 530 may simultaneously receive DC power from the non-insulating type DC power distributer 510 and a DC power source 570. In this case, the charging circuit 530 may perform control to supply DC power to the charging battery 540 so as not to exceed a predetermined DC voltage range required for the corresponding charging battery 540. That is, the charging circuit 530 may provide an element for preventing the charging battery 540 from being damaged due to overvoltage.

The non-insulating type DC power distributer 510 may identify whether power needs to be supplied to the dimming circuit 520 according to a control signal of the controller 550. As the identification result, when it is not necessary to supply power, the non-insulating type DC power distributer 510 may shut off power to the dimming circuit 520.

The controller 550 may monitor a charging state of the charging battery 540. As the charging result, when the charging state is a charging complete state, the controller 550 may transmit a predetermined control signal to the charging circuit 530 so as not to supply power to the charging battery 540.

Figure 6:
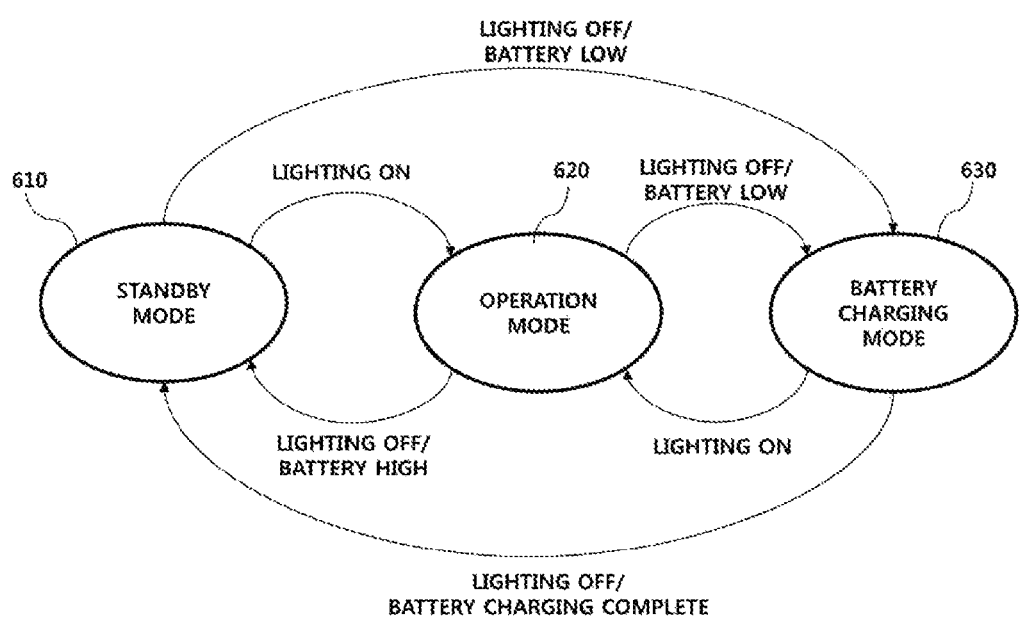
FIG. 6 is a state transition diagram for explanation of an operation state transition procedure of a wireless dimming apparatus according to an embodiment.

FIG. 6 is a state transition diagram for explanation of an operation state transition procedure of a wireless dimming apparatus according to an embodiment.

Referring to FIG. 6, an operation state of the wireless dimming apparatus may largely include a standby mode 610, an operation mode 620, and a battery charging mode 630.

The standby mode 610 may be a state in which the wireless dimming apparatus is on standby to receive a lighting control signal from an external user device using a battery installed in the wireless dimming apparatus when a lighting apparatus is not driven. In the standby mode 610, upon receiving a predetermined control signal for turning on a lighting, the wireless dimming apparatus may transit the current mode to the operation mode 620 in receive DC power output by a driving power apparatus and to drive a lighting circuit. The wireless dimming apparatus according to an embodiment may perform battery charging using DC power output by the driving power apparatus from the operation mode 620.

In the standby mode 610, when the lighting is OFF and a battery charging state is a predetermined battery LOW state—here, a battery LOW state refers to battery charging amount required for instantaneous battery charging—, the wireless dimming apparatus may be transited to the battery charging mode 630. In this case, the wireless dimming apparatus may receive DC power from an external DC power source for supplying DC power using renewable energy and perform battery charging.

In the operation mode 620, when the lighting is OFF and a battery charging state is a predetermined battery HIGH state—here, a battery HIGH state refers to battery charging amount when the battery charging state is a standby state for a predetermined time period, the wireless dimming apparatus may be transited to the standby mode 610.

In the operation mode 620, when the lighting is OFF and a battery charging state is a battery LOW state, the wireless dimming apparatus may be transited to the battery charging mode 630 and perform battery charging.

In the battery charging mode 630, when the lighting is ON, the wireless dimming apparatus may be transited to the operation mode 620.

During battery charging when the lighting is ON, the wireless dimming apparatus may receive a predetermined lighting control signal for OFF of the lighting. In this case, when a battery charging state is a charging complete state, the wireless dimming apparatus may be transited to the standby mode 610.

Figure 7:
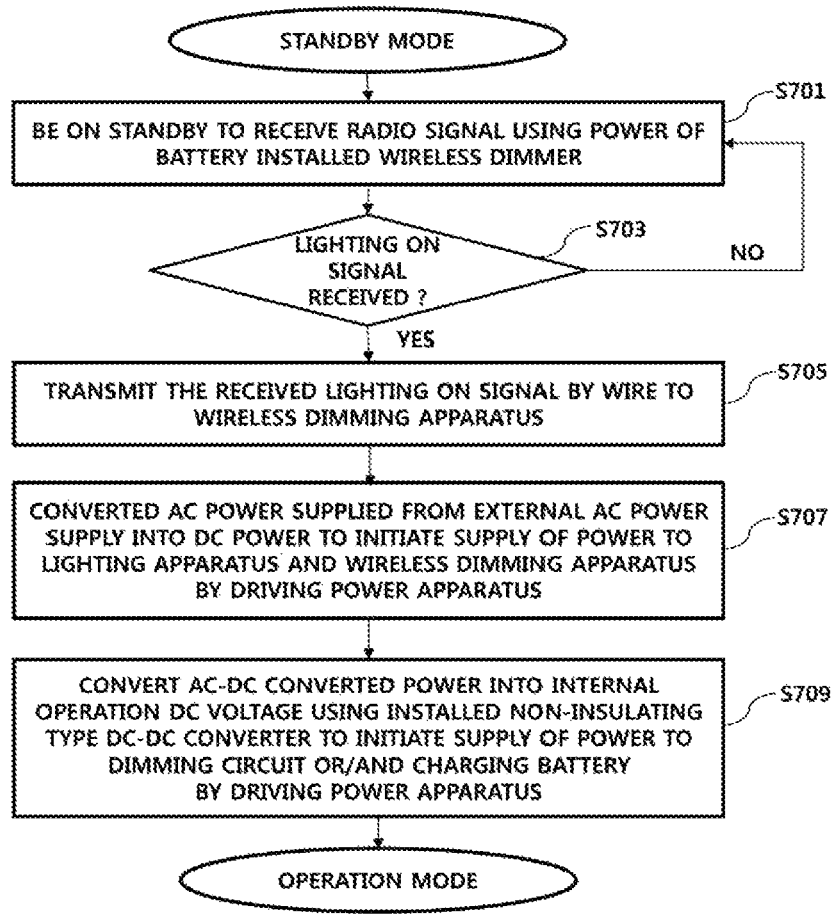
FIGS. 7 to 9 are flowcharts for explanation of a method of supply DC power in a wireless dimming system according to an embodiment.
Figure 8:
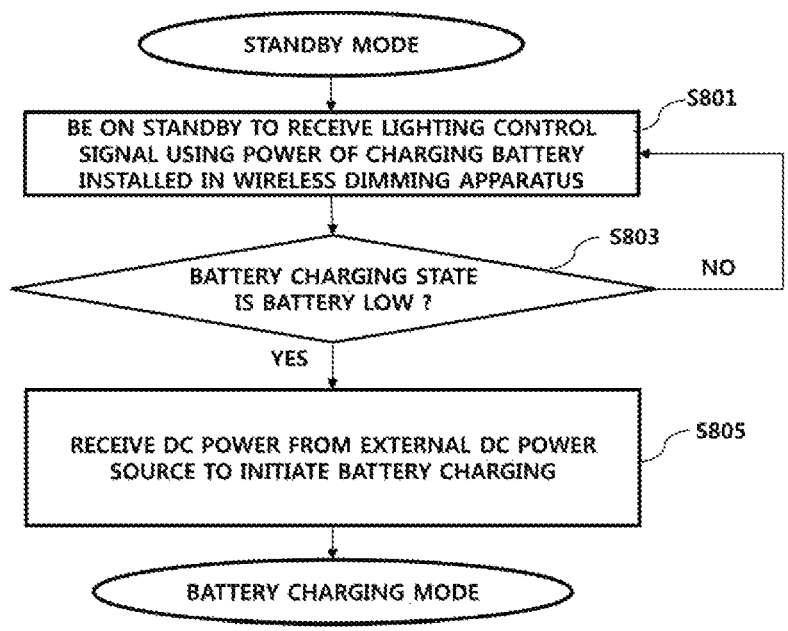
Figure 9:
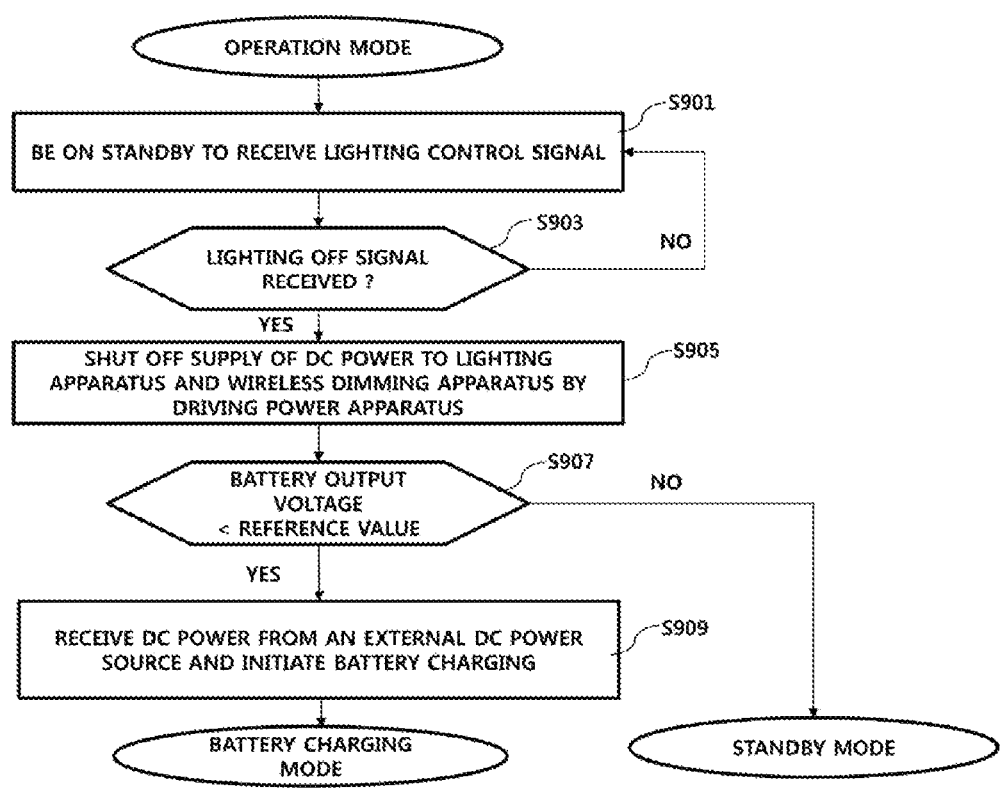

FIGS. 7 to 9 are flowcharts for explanation of a method of supply DC power in a wireless dimming system according to an embodiment.

Referring to FIG. 7, in the standby mode 610, the wireless dimming apparatus may be on standby to receive a lighting control signal from an external user device using power of a charging battery (S701).

In the standby mode 610, upon wirelessly receiving a predetermined lighting control signal for turning on the lighting, the wireless dimming apparatus may transmit the received lighting control signal to a driving power apparatus by wire (S703 to S705). In this case, the wireless dimming apparatus may be transited to the operation mode 620 from the standby mode 610.

Continuously, the driving power apparatus may be controlled to convert external AC power into DC power and supply the AC-DC converted power to the lighting apparatus and the wireless dimming apparatus (S707).

upon receiving the AC-DC converted power from the driving power apparatus, the wireless dimming apparatus may convert the received power into a predetermined internal operation voltage using an installed non-insulating type DC-DC converter and supply the converted DC voltage to an internal dimming circuit or(and) a charging battery (S709).

The state of the wireless dimming apparatus may be transited into the operation mode 620 from the standby mode 610.

Referring to FIG. 8, in the standby mode 610, the wireless dimming apparatus may be on standby to receive a lighting control signal from an external user device using a charging battery power source installed in the wireless dimming apparatus (S801).

In a signal standby state, when a battery charging state is transited to a predetermined battery LOW state—that is, when a current battery charging remaining amount is reduced to a predetermined threshold value or less—, the wireless dimming apparatus may be transited to the battery charging mode 630 and receive DC power from an external DC power wince to initiate battery charging (S803 to S805).

Referring to FIG. 9, in the operation mode 620, the wireless dimming apparatus may be on standby to receive a lighting control signal from an external user device (S901).

Upon receiving a predetermined lighting control signal for turning off the lighting, the wireless dimming apparatus may transmit a predetermined control signal to the driving power apparatus and shut off DC power supplying to the lighting apparatus and the wireless dimming apparatus (S905).

Continuously the wireless dimming apparatus may determine whether an output voltage of a battery installed therein is equal to or less than a predetermined reference value (S907).

As the determination result, when the battery output voltage is equal to or less than the predetermined reference value, the wireless dimming apparatus may receive DC power from an external DC power source and initiate battery charging (S909). In this case, the wireless dimming apparatus may be transited to the battery charging mode 630 from the operation mode 620.

As the determination result of operation 907, when the battery output voltage exceeds the reference value, the wireless dimming apparatus may be transited to the standby mode 610 from the operation mode 620.

As is apparent from the above description, the method and apparatus according to the disclosure have the following effects.

The disclosure is advantageous to provide a method, of supplying DC power to a wireless dimming apparatus and an apparatus and system therefor.

The disclosure is advantageous to provide a wireless dimmer obtained by removing an AC circuit to achieve a small value and high stability by supplying DC power to the wireless dimmer and a method of supplying DC power to the wireless dimmer.

In addition, the disclosure is advantageous to provide a wireless dimming apparatus using renewable energy such as sunlight and wind force.

Although embodiments have been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless dimming apparatus operatively associated with a driving power apparatus operating with alternating current (AC) power, comprising:
   a controller;
   a non-insulating type direct current (DC)-DC converter for receiving DC power AC-DC converted by the driving power apparatus and converting the DC power into a predetermined operation voltage of the wireless dimming apparatus;
   a wireless communicator for demodulating a radio frequency (RF) signal received through an installed antenna and transmitting the RF signal to the controller;
   a dimming circuit for receiving a predetermined lighting control signal corresponding to the demodulated RF signal from the controller and transmitting the predetermined lighting control signal to the driving power apparatus; and
   a DC power switch for supplying the predetermined operation voltage to the dimming circuit according to a predetermined control signal of the controller;
   a charging battery for supplying power required for operations of the controller and the wireless communicator in a standby mode,
   wherein the DC power is directly supplied to a lighting apparatus,
   wherein the DC power switch supplies the predetermined operation voltage to the charging battery in response to the predetermined control signal from the controller.

2. The wireless dimming apparatus according to claim 1, wherein:
   the controller monitors a current battery charging state of the charging battery; and when the current battery charging state is a charging complete state, the controller controls the DC power switch to shut off supply of the predetermined operation voltage to the charging battery.

3. The wireless dimming apparatus according to claim 1, wherein, when the predetermined lighting control signal is a predetermined lighting ON signal for driving the lighting apparatus connected to the driving power apparatus, the DC power is supplied to the non-insulating type DC-DC converter.

4. The wireless dimming apparatus according to claim 3, wherein:
when the lighting apparatus is driven and the predetermined lighting control signal for stopping drive of the lighting apparatus is transmitted to the driving power apparatus by the dimming circuit, supply of the DC power to the non-insulating type DC-DC converter is stopped; and
when supply of the DC power is stopped, the charging battery is charged by receiving DC power from an external DC power source.

5. The wireless dimming apparatus according to claim 4, wherein the DC power generated using at least one of sunlight and wind force is supplied to the charging battery from the external DC power source.

6. The wireless dimming apparatus according to claim 1, wherein intensity of DC power AC-DC converted by the driving power apparatus is changed according to the predetermined lighting control signal.

7. A wireless dimming system comprising:
a lighting apparatus with illumination being variable according to intensity of received power;
a driving power apparatus comprising an insulating type alternating current (AC)-direct current (DC) converter for receiving the AC power, converting the AC power into DC power, and supplying the converted DC power to the lighting apparatus; and
a wireless dimming apparatus comprising a dimming circuit for transmitting a predetermined lighting control signal acquired by demodulating a received RF signal to the driving power apparatus and a non-insulating type DC-DC converter for receiving the DC power converted by the insulating type AC-DC converter and converting the DC power into a predetermined operation voltage,
wherein the wireless dimming apparatus further comprises:
a controller;
a DC power switch for supplying the predetermined operation voltage to the dimming circuit according to a predetermined control signal of the controller; and
a charging battery for supplying power required for operations of the controller in a standby mode,
wherein the DC power is directly supplied to the lighting apparatus,
wherein the DC power switch supplies the predetermined operation voltage to the charging battery in response to the predetermined control signal from the controller.

8. The wireless dimming system according to claim 7, wherein:
the wireless dimming apparatus further comprises the charging battery for supplying the predetermined operation voltage for demodulating the RF signal in the standby mode; and
when the predetermined lighting control signal is a predetermined lighting OFF signal for stopping drive of the lighting apparatus, the charging battery is charged by receiving DC power from an external DC power source.

* * * * *